Patented Dec. 4, 1951 2,576,919

UNITED STATES PATENT OFFICE 2,576,919

NATURAL APPLE PRESERVING METHOD

Adam J. Borck, Canon City, Colo.

No Drawing. Application September 17, 1948, Serial No. 49,850

9 Claims. (Cl. 99—154)

My invention relates to the art of preserving apples in their natural state and to the apples constituting the product of such method.

In the past various methods have been devised for preserving applies in their natural state for storage over long periods or during shipment to distant points. While certain of these methods have been satisfactory in general, the apples so treated lose their firmness and develop a mealy consistency, and hence are not in much demand with buyers.

It is an object of the present invention to provide a simple, efficient and economical method of preserving apples in their natural state so as to maintain the flavor, aroma and consistency of the pulp, as well as the natural appearance of the apple.

Another object of this invention is to provide a novel method of packing fresh apples so as to utilize the breathing action of the apples in inducing absorption of preserving fluids or vapors which maintain the fresh appearance and qualities of the apple for protracted periods.

A further object is to produce a novel type of fresh apple which may be maintained in storage for periods of as much as nine to twelve months without any apparent deterioration in its appearance or edible properties.

These and other objects, all of which will be fully described, will be described in detail in the following description.

The practice of the present invention appears to be well suited for use on all varieties of apples. In the case of the Jonathan apples which apparently do not breathe through their skins (i. e. intake and discharge of gases or vapors) as the other varieties do, the breathing is through calyx end and consequently the same preservative methods may be applied to this variety. The apples, immediately after picking and grading are packaged and either shipped to the sales market or are stored until such time as the market demand is advantageous for selling.

In preferred practice, a treatment solution is prepared by mixing two gallons of any standard table salt (NaCl) with eight gallons of water and a small quantity of honey, such as one pound, for example. The mixture is agitated, as by stirring, until a true solution is formed (i. e. all solid matter is converted into liquid. After the mixing action is completed a wettable sack containing one pound of charcoal is suspended in the solution and allowed to remain until the batch is completely withdrawn from the mixing container. If desired, the honey may be placed in the sack with the charcoal instead of mixing as above described.

Sheets of heavy weight white blotting paper (2 to 3 times the thickness of desk blotting paper) are cut to a size to fit the standard apple packing box and are immersed in the aforesaid solution for as much as forty-eight hours to become completely impregnated with the solution. After being so impregnated at least one of these sheets is placed beneath the bottom layer and on top of the top layer of apples packed in the box. If desired, one of these sheets may be inserted between each layer or tier of apples in the box. The box is then closed in the regular manner, as by nailing.

The pads impregnated as just described retain enough of their moisture content for periods up to one year to provide the necessary moisture or vapor interchange with the individual apples during their natural breathing action to provide the necessary preservation qualities. As a consequence, there is no noticeable loss of flavor or aroma, and the pulp has the firm, juicy consistency of freshly picked apples. The external appearance of the apple also shows no apparent deterioration from its freshly picked quality, even after being in storage for as long as twelve months.

While the procedure set forth in the preceding description represents a preferred practice of my invention, it will be apparent that many variations may be availed of within the scope of the invention. As an example, I use standard apple boxes and pads fitting such boxes. However, other types of containers, such as bushel baskets, may be utilized, in which event the pads will be made to fill the space of such baskets.

The proportioning of ingredients may be varied somewhat without materially reducing efficiency. Thus, the amount of honey may be varied within limits although it is not advisable to use much less than one pound in a batch of the type cited as a preferred formula.

Where the apples are to be kept in storage for a considerable period before marketing, best results will be obtained by cold storage. If desired, the apples may be subjected to the usual cold storage conditions existing in commercial plants (31° F. for apples), although they will be effectively preserved if maintained in the atmospheres of higher temperature, as for example 32° to 45° F. Also if earth cellar storage facilities are available, the apples preserved according to this method may be stored in such facilities with very effective results.

In the preferred type of this invention I use charcoal introduced into the solution in the manner described. It will be apparent that finely ground charcoal may be introduced directly into the treatment solution and agitated sufficiently to insure its dispersion through the liquid. Objection to such procedure is that the charcoal does not go completely into solution and hence leaves an unsightly residue, which detracts from the eye-appeal of the package or container.

From the foregoing, it will be apparent that variations may be employed within the spirit and scope of the invention. Among the many advantages of the present invention is its simplicity of operation, permitting use by individual growers, as well as by commercial packers. For this reason the variations in operating procedure have been set forth in some detail, but are not intended to limit the scope of the invention except as set forth within the limits of the hereunto appended claims.

I claim:

1. A method of preserving fresh apples in their natural state, which comprises packing apples in a container in a layer interposed between sheets of relatively thick moisture absorbent paper impregnated with a solution of salt and honey, which solution has been treated by intimate contact with carbon so as to induce a vapor interchange between individual apples and the contained solution of the paper during the normal breathing of the apple.

2. The method as set forth in claim 1 in which the solution consists of two gallons of table salt, eight gallons of water, and approximately one pound of honey, said solution having been treated by intimate contact with charcoal.

3. In the art of preserving apples in their natural state, the improvement which comprises placing a plurality of apples in a confined zone with the apples in contact with an absorbent medium on their top and bottom surfaces, said medium containing a sufficient quantity of an aqueous solution consisting of salt and honey, which solution has been treated by intimate contact with charcoal, to provide a vapor interchange with said apples in the normal breathing of the apples.

4. In the art of preserving apples in their natural state, the improvement which comprises placing a plurality of apples in a confined zone with the apples in contact with an absorbent medium on their top surface, said medium containing a sufficient quantity of an aqueous solution consisting of salt and honey, which solution has been treated by intimate contact with charcoal, to provide a vapor interchange with said apples in the normal breathing of the apples.

5. In the art of preserving apples in their natural state, the improvement which comprises placing a plurality of apples in a confined zone with the apples in contact with an absorbent medium on their bottom surface, said medium containing a sufficient quantity of an aqueous solution consisting of salt and honey, which solution has been treated by intimate contact with charcoal, to provide a vapor interchange with said apples in the normal breathing of the apples.

6. In the art of preserving apples in their natural state, the improvement which comprises placing a plurality of apples in a confined zone with the apples in contact with an absorbent medium on their top and bottom surfaces, said medium containing a sufficient quantity of an aqueous solution consisting of salt and honey, which solution has been treated by intimate contact with charcoal, to provide a vapor interchange with said apples in the normal breathing of the apples, and maintaining the temperature of said confined zone below 45° F.

7. In the art of preserving apples in their natural state, the improvement which comprises placing a plurality of apples in a confined zone with the apples in contact with an absorbent medium on their top and bottom surfaces, said medium containing a sufficient quantity of an aqueous solution consisting of salt and honey, which solution has been treated by intimate contact with charcoal, to provide a vapor interchange with said apples in the normal breathing of the apples, and maintaining the temperature of said confined zone between 31° F. and 45° F.

8. A method of preserving fresh apples in their natural state, which comprises packing freshly picked apples in a container in at least one layer interposed between sheets of relatively thick, moisture-absorbent paper substantially saturated with a true solution of salt and honey, which solution has been treated by intimate contact with carbon, so as to induce a vapor interchange between individual apples and the contained solution of the paper during the normal breathing of the apple, and then placing the packed apples in an atmosphere maintained between 31° F. and 45° F.

9. A method of preserving fresh apples in their natural state, which comprises packing freshly picked apples in a container in at least one layer interposed between sheets of relatively thick, moisture-absorbent paper substantially saturated in an aqueous solution of salt and honey, which solution has been treated by charcoal contained in a wettable sack and immersed therein, so as to induce a vapor interchange between individual apples and the contained solution of the paper during the normal breathing of the apples, and then placing the apples in an atmosphere maintained between 31° F. and 45° F.

ADAM J. BORCK.

REFERENCES CITED

The following references are of record in the file of this patent:

UNITED STATES PATENTS

| Number | Name | Date |
|---|---|---|
| 201,811 | McCulley | Nov. 27, 1877 |
| 1,541,492 | Guenther | June 9, 1925 |
| 2,336,291 | Phillips | Dec. 7, 1943 |

OTHER REFERENCES

Brooks et al.: "Nature and Control of Apple Scald," reprinted from Journal of Agricultural Research, vol. XVIII #4, November 15, 1919, pages 233 to 236.